United States Patent [19]

Monot et al.

[11] 4,348,049

[45] Sep. 7, 1982

[54] PROTECTING DEVICE FOR CARRYING CHILDREN

[76] Inventors: Michel Monot, Les Bois des Grottes, Asnières les Dijon; Hubert Monot, Asnières les Dijon, both of 21380 Messigny, France

[21] Appl. No.: 205,954

[22] PCT Filed: Nov. 7, 1979

[86] PCT No.: PCT/EP79/00088

§ 371 Date: Jul. 3, 1980

§ 102(e) Date: Jul. 3, 1980

[87] PCT Pub. No.: WO80/00946

PCT Pub. Date: May 15, 1980

[30] Foreign Application Priority Data

Nov. 8, 1978 [FR] France .............................. 78 32063

[51] Int. Cl.³ .............................................. A47D 1/10
[52] U.S. Cl. ..................................... 297/254; 297/437
[58] Field of Search ............... 297/250, 254, 255, 256, 297/377, 437

[56] References Cited

U.S. PATENT DOCUMENTS

| | | | |
|---|---|---|---|
| 2,890,740 | 6/1959 | Larson | 297/254 |
| 3,550,998 | 12/1970 | Boudreau | 297/254 |
| 3,563,600 | 2/1971 | Converse | 297/254 |
| 3,690,525 | 9/1972 | Koons | 297/255 |
| 4,026,448 | 5/1977 | Lewis | 297/377 |
| 4,082,350 | 4/1978 | Tomforde | 297/250 |
| 4,183,580 | 1/1980 | Johansson | 297/345 |

*Primary Examiner*—Francis K. Zugel
*Attorney, Agent, or Firm*—Robert E. Burns; Emmanuel J. Lobato; Bruce L. Adams

[57] ABSTRACT

The enveloping rigid shell (A), made in one piece, comprises a hood (2) protecting the head of the child, a bottom (1) forming a back or cradle, a seat (3), a gutter (4) for the legs, a movable foot rest in the gutter. To be appropriate for use as a baby carrier, straps for the horizontal transport are provided and for use as a push chair these straps allow in cooperation with a groove (37) the attachment onto a foldable carriage, with three attachment means onto the frame (B): two buckles (15) with ratchet mechanism of a same type of security belt on either side of the shell, a notch (20) into which a small tongue (33) from the base of the frame penetrates. The frame (B) of which the periphery is complementary to that of the shell (A) comprises anchoring means (34,36) onto a back of the seat of the vehicle and fixing means (18,33) for the rapid unhooking from the shell (A). It further comprises a protecting shield of flexible material arranged so as to receive the child in case of a shock.

8 Claims, 5 Drawing Figures

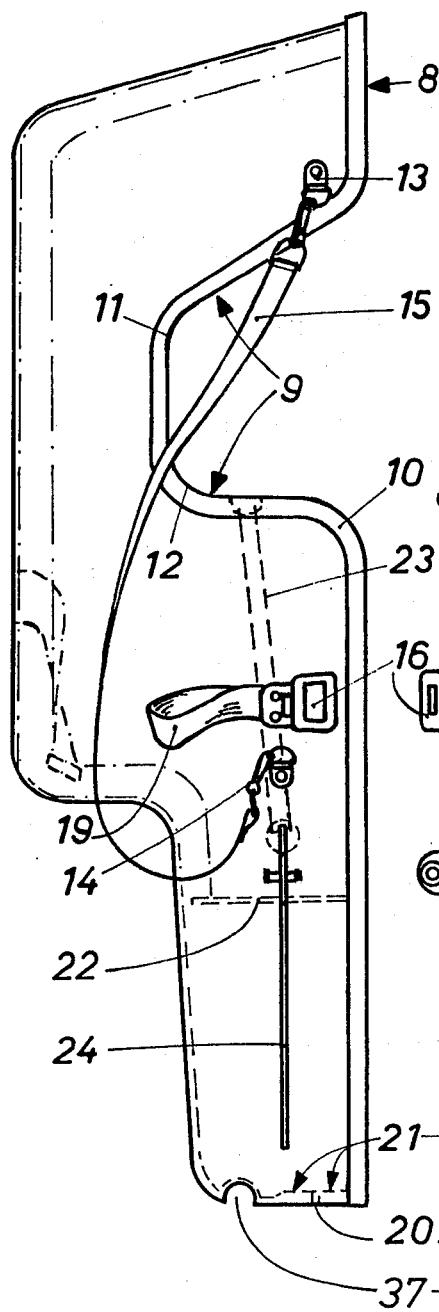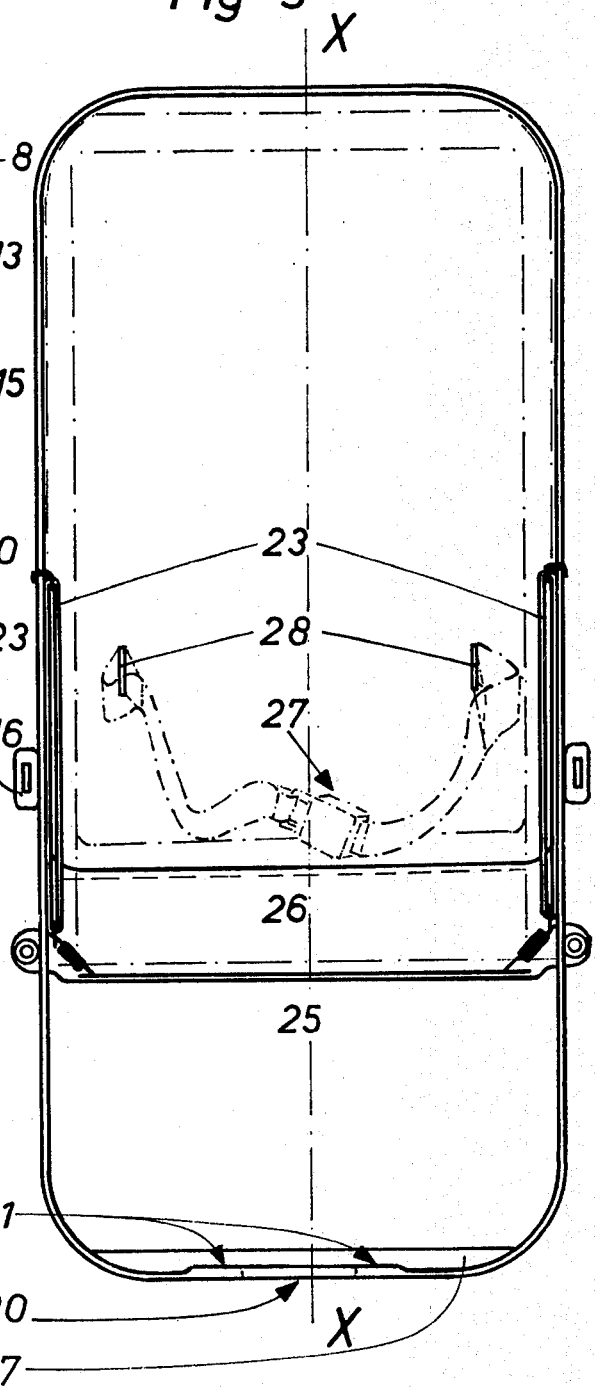

U.S. Patent  Sep. 7, 1982  Sheet 3 of 3  4,348,049
Fig 4
Fig 5
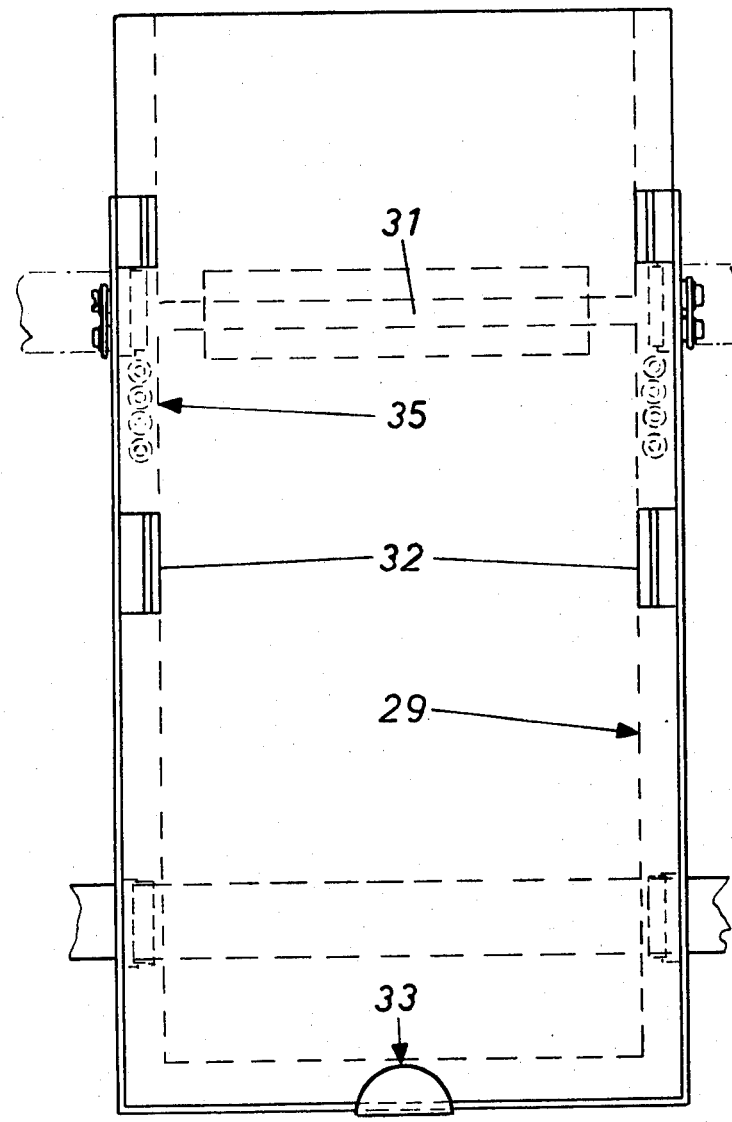
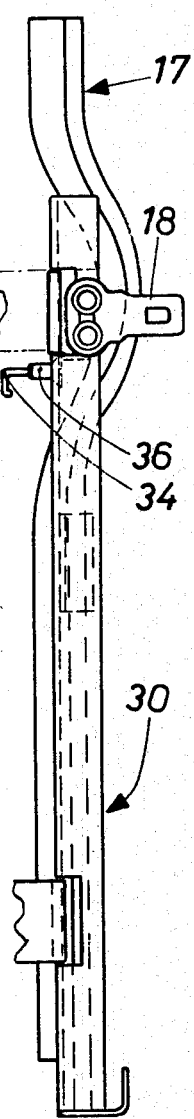

PROTECTING DEVICE FOR CARRYING CHILDREN

The invention relates to means for carrying children notably inside motor vehicles, more particularly a protection device comprising a wrapping back-rest provided with a head-rest overlying a seat surrounded by upholstered sides, a foot-rest, the assembly being adapted to be secured by suitable means between the front and rear seats of a vehicle, against the back thereof.

In this field, various prior art structures are known.

The U.S. Pat. No. 1,380,678 to PRICE discloses a child armchair comprising a back-rest, arm-rests and a foot-rest mounted through hooking means to the back-rest of the front bench-seat and comprising leg means bearing on the floor of the vehicle.

The U.S. Pat. No. 2,890,740 to LARSON relates to a child's seat comprising a foot-rest, means for hooking same to the backseat and vertically adjustable leg means.

The U.S. Pat. No. 1,629,834 to MILLER discloses a child's seat detachable secured to the back-rest.

The French Patent Application 76 27055 discloses a child's armchair for automobile, which comprises more particularly a back-rest provided with a head-rest, a device for maintaining the child against the back-rest, arm-rests, a foot-rest mounted for vertical adjustment on a rigid frame structure provided with leg means bearing on the floor of the automobile, said frame structure being held in position between the front and rear seats of the automobile by means for anchoring same to the back-rest of the front bench, characterized in that the distance between the back-rests of the armchair and the front bench is determined by the adjustable length of the armchair arm-rests.

The inconveniences common to these constructions lie in the fact that the child's safety, in the event of a shock from the rear is not sufficient, on the one hand, and in that separating the seat from the means for anchoring same in the vehicle constitutes a tedious operation, on the other hand.

The scope of the invention is to provide a protection device for the occupant which is both efficient with respect to shocks, irrespective of their direction, and self-contained so that it can be quickly removed from the vehicle without having to remove the child from its protection casing in which he can be transported also outside the vehicle.

For this purpose, the device according to the invention is characterized by the fact that it consists of at least two separate elements provided with means for quickly uncoupling them from each other, one of said elements consisting of a rigid shell enveloping the child from head to feet, which comprises an open face of which the major portion of the periphery lies in a single plane substantially parallel to the solid bottom of the shell, said shell being a unitary structure comprising several sections, a hood, a bottom, a seat, a cradle for the legs in which a suspended foot-rest is slidably mounted, the other element being a rigid frame provided with means for securing same to the back-rest of the vehicle seat, means for quickly fastening the shell to the frame, means for holding the latter in a predetermined position in relation to said frame.

The main advantageous features characterizing this device lie in the fact that the rigid shell protects the child from all shocks, both within the vehicle or when it is used as a cradle for transporting the child, and in the fact that fitting the shell in position in a car, as well as removing it therefrom, constitute easy and fast operations, without requiring the removal of the child from the shell in which he can ball asleep or at least feel comfortable and wriggle without any risk.

Other advantages will appear from the following description of a preferred but not limiting form of embodiment of the device, and from the drawing, in which:

FIG. 2 is a side view of the shell;

FIG. 3 is a front elevational view of the shell;

FIG. 4 is a front elevational view of the frame structure;

FIG. 5 is a side view of the frame structure.

Figure 1:
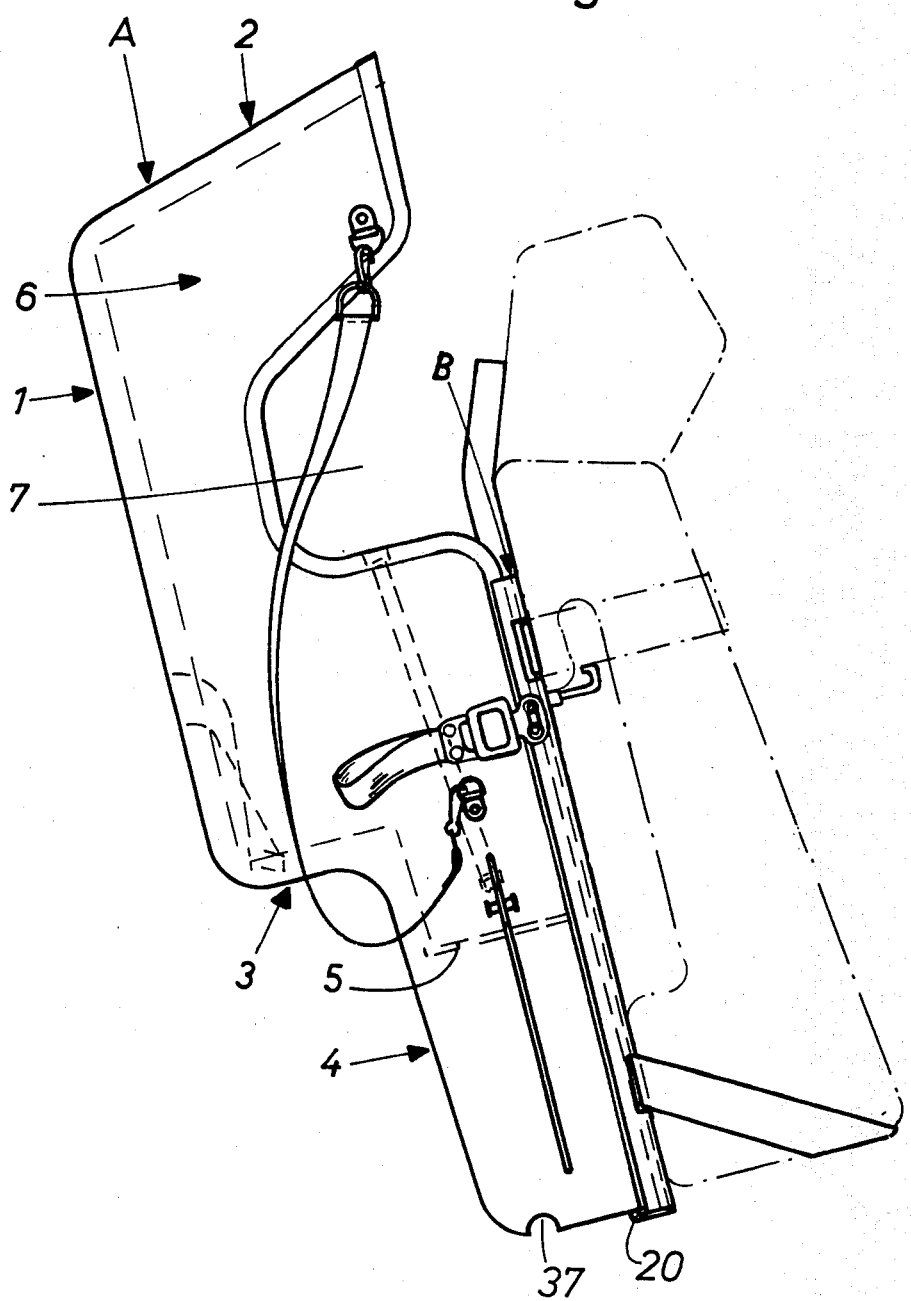
FIG. 1 is a general view of the device fitted to the back-rest of a car.

FIG. 1 affords the view of the two elements constituting the device according to the invention:

The rigid shell A envelopping the child from head to feet, open on the side opposite the shell bottom 1, so as to constitute a receptacle for the child who can see in front and about him without any hindrance.

The rigid frame B provided with means for fixing it to the back rest of a vehicle seat, for receiving said shell and holding same in a predetermined position in relation to the frame.

The shell A, a unitary member like boat hulls, made of glass fabric impregnated with polymerized resin, is reinforced at the level of the child's head by carbon fibres.

Several sections can be distinguished in this unitary shell:
a hood 2 protecting the child's head,
a back-rest forming bottom 1,
a seat 3 on which the child is seated,
a cradle 4 for the legs,
a foot-rest 5 movable in the cradle.

The shell sides 6 comprise a notch 7 defining the lower edge of the hood 2 so that the child can see on both sides and does not feel as if he were enclosed in a case.

FIGS. 2 and 3 show constructional details of the shell A duly provided with accessories which are an integral part of the device disclosed herein.

The edges 8 of the shell lie in a common plane substantially parallel to the bottom 1, except for the edges 9 of notch 7. A protection bead 10 lines said edges and assist in imparting a relative rigidity thereto, notably along the curved sections 11,12 of notch 7. These sections 11, 12 are also reinforced with carbon fibres in order to increase the general strength of the hood which might be impaired by the notches 7 directed only to improve the child's comfort.

These notches 7 are by no means essential and, due to the inconvenience they constitute with respect to the hood in relation to the shell assembly in case of shock from the rear, may be avoided. In other forms of embodiment, not shown, the notches are:
either dispensed with so that the peripheral edges of the shell lie completely in a single common plane;
or partially closed by one or more possibly detachable bars,
or closed by a transparent plate also detachable to facilitate the ingress of the child into the shell.

The shell A comprises several means affording different uses:

hanging points 13,14 for a strap 15 whereby the shell A can be suspended to act as a transportable cradle or attached to a folding cart mounted on wheels to convert same into a perambulator, the fixing of the shell to the cart being completed by a groove 37 adapted to receive the cart wheel support;

a pair of buckles 16 engageable by the hasps of safety belts of which a pair identical with the hasps 18 of the safety belts fitted on the car are secured to the frame B, so that by cooperating with a slit 20 provided in the bottom of cradle 4 and having its edge reinforced by a portion 21 of increased thickness they afford an easy positioning thereof to the rear face of a vehicle seat to which the frame B would have been fitted beforehand, and more particularly a likewise easy quick removal of the device from the vehicle, without having to disturb the child who in many cases will be asleep.

The advantage resulting from this fixing system is extremely important from a safety point of view, notably in case of crash when the risk of fire is particularly high: the shell will protect the child against shocks, flames and, more particularly, when removing the child from the vehicle, it is recommended to leave the child in this protection receptacle.

This transportable comfort also permits of leaving in position the frame B and even of fitting several frames in several cars to be used with the same shell A which is transferred from one frame to another as required.

A pair of loop-shaped straps or handles 19 secured to the shell at the level of buckles 16 are provided for fixing the shell A flat to the rear seat when the child is too young to sit down, by causing the safety belt to pass through at least one strap 19. In this specific case, a protection net is attached to the edges of the shell so as to wrap up these edges and prevent the child from being ejected from the shell in case the car overturned. The materials used for making the shell and those utilized for coating or lining same both externally and internally are self-extinguishable.

The foam material utilized for the many upholstered portions of the shell is also used for constituting the protection shield 17 disposed between the shell A and the frame B, against the rear face of the back-rest of a car seat.

This foam material has a density of the order of 40 kg/cu.m., and is referred to as being of "firm quality", and is self-extinguishable in case of accidental ignition.

The seat 3 is covered with a cushion forming an integral part of the inner upholstering of the shell, which is a one-piece element, detachable or sewn, molded or injected integrally with said foam.

A foot-rest 22, suspended on either side by means of elastic straps 23 attached to the sides of cradle 4, is adapted to slide in and pass through the latter at right angles to its axis XX. The elastic straps 23 are also provided for damping out shocks to the child's knees against the sides of cradle 4.

The foot-rest 22 cut from sheet metal or molded from plastic material is duly covered with a soft upholstering material, including its outer periphery the cutting edge of which is thus deadened. It is provided with a pair of lugs 25 of a length sufficient to extend through a pair of longitudinal slots 24 cut in the sides of cradle 4 and acting as slideways. A rivet fixed to each lug prevents the latter from escaping from its slot 24 and the foot-rest from jamming diagonally in the cradle. Each lug lying in a plane perpendicular to that of said foot-rest, its fastening edge is provided with a protection bead 26 to prevent the child's feet from being hurt. The foot-rest 22 collapses in a way under the lightest shock and the child then stands up against the foam shield 17 in front of him, thus preventing any luxation or bone fracture, notably a hip bone fracture of which the joints are notoriously fragile.

To retain the child in the shell A, two means are employed:

a safety belt 27, having a limited yet real elasticity when the child is disposed within the shell, by an elastic strap 28 constituting a loop on each side so that the child has the impression that he has a certain liberty of movement, strictly limited in case of shock;

the aforesaid protection net.

The frame B illustrated in FIGS. 4 and 5, constitutes a rectangle consisting of an angle member having one wing 29 disposed against the back-rest of a vehicle seat, the other wing 30 carrying the hasps 18 for fixing the shell A into the receiving buckles 16 attached to the shell.

A flat iron 31 reinforces the fastening points and holds the hasps 18 at a proper relative spacing, these hasps being provided with a protection cap to prevent them from constituting a danger for the rear passenger when the shell A is not fitted in the frame B.

The major sides of the frame are provided with angle members 32 disposed at spaced intervals on the wing 29 so that the edges 8 of the shell be firmly held and cannot escape from the frame in case of lateral shocks. The frame portion positioned in the lower portion of the back-rest of a vehicle seat comprises, at equal distances from the two major sides, a tongue 33 engageable into the shell slot 20 for accurately positioning the shell A in relation to the frame B, so that the hasps 18 can snap without difficulty into the buckles 16. The frame B is secured to the back-rest of a vehicle seat by means of at least one strap passed around this back-rest and also, when permitted by the specific structure of this back-rest, by means of a pair of rods 34 having one bent edge adapted to pass behind a back-rest reinforcement: the other, screw-threaded end passing through one of the holes 35 formed in wing 29 of the major sides of said frame, so as to be tightened by means of a hollow screw 36 to prevent the end of said rod 34 from protruding induly and thus constitute an unevenness likely to hurt the child.

When the device is anchored to the front seat of a car and this seat is not occupied, the position of the back-rest of this seat is reinforced by fitting the safety belt associated therewith so that the back-rest will be retained in case of shock, without causing the weight of the child in the shell A secured to the frame B to push the back-rest forwards in the car.

We claim:

1. Protection device for carrying children, which comprises, more particularly, an enveloping back-rest provided with a head-rest overlying a seat surrounded by upholstered sides, a foot-rest, this assembly being adapted to be secured by suitable means behind the seat of a vehicle, characterized by the fact that it consists of at least two elements independent of each other and provided with means for quickly coupling and uncoupling these elements, one element consisting of a rigid shell surrounding the child from head to feet, which comprises an open side of which the major portion of the outer periphery lies in a single plane substantially parallel to the solid bottom of the shell, said shell being a unitary member comprising several sections, a hood, a bottom, a seat, a cradle for receiving the legs, in which a suspended foot-rest is slidably mounted, the other element being a rigid frame provided with means for fixing it to the back-rest of a vehicle seat, means for quickly fastening the shell to the frame, means for holding said shell in a predetermined position in relation to the frame.

2. Protection device according to claim 1, characterized in that the quick-action means for coupling and uncoupling the shell and frame to and from each other consist of three points, namely two safety belts on the shell with two corresponding hasps on the frame disposed on either side of the longitudinal center line of the shell, substantially intermediate its major length, and a slot at the bottom of the cradle which is engageable by a tongue (33) of the frame.

3. Protection device according to claim 2, characterized in that the frame comprises on each one of its major sides, at least one groove (32) adapted to receive one portion of the peripheral edge of the shell when the latter is positioned against the frame, in order to prevent any undesired lateral movement of the shell in relation to the frame.

4. Protection device according to claim 1, characterized in that the shell comprises on either side at least two points for fixing a strap, which are so disposed as to permit the transport of a child laying in the shell.

5. Protection device according to claim 1, characterized in that the lower portion of the shell cradle comprises a groove (37) adapted to receive the axle of the wheels of a light collapsible cart permitting of utilizing the shell as a perambulator.

6. Protection device according to claim 1, characterized in that the holding belt (27) comprises on each one of its spans an elastic strap (28) permitting a controlled elongation thereof.

7. Protection device according to claim 1, characterized in that the foot-rest is movable in the cradle (4), suspended under the seat (3) by means of elastic straps (23) also acting as shock-absorbers, and comprises on either side a lug (25) slidably engaging a lateral groove (24) of said cradle, said lug being provided, externally of the cradle, with a rivet of which the axis extends at right angles to the groove.

8. Protection device according to claim 1, characterized in that a rod (31) holds said hasps (18) at a proper relative spacing on said frame.

* * * * *